United States Patent [19]
Röhm

[11] Patent Number: 5,167,175
[45] Date of Patent: Dec. 1, 1992

[54] LATHE CHUCK

[76] Inventor: Günter H. Röhm, Heinrich-Röhm-Strasse 50, D-7927 Sontheim, Fed. Rep. of Germany

[21] Appl. No.: 641,160

[22] Filed: Jan. 14, 1991

[30] Foreign Application Priority Data

Jan. 12, 1990 [DE] Fed. Rep. of Germany ....... 4000715
Jan. 13, 1990 [EP] European Pat. Off. ........ 90100698.1

[51] Int. Cl.⁵ ............................................. B23B 31/26
[52] U.S. Cl. ...................................... 82/142; 279/110
[58] Field of Search .............. 279/1 H, 1 K, 121, 110, 279/64, 60, 69, 114–116; 82/142; 409/233

[56] References Cited

U.S. PATENT DOCUMENTS

| | | |
|---|---|---|
| 237,731 | 2/1881 | Doyle . |
| 1,548,949 | 8/1925 | Horton ............................ 279/1 H |
| 1,565,733 | 12/1925 | Godfriaus ......................... 279/114 |
| 1,786,147 | 12/1930 | Bullard . |
| 2,993,701 | 7/1961 | Arnold ............................ 279/121 |
| 4,567,794 | 2/1986 | Bald ................................ 82/1.11 |
| 4,758,006 | 7/1988 | Hiestand ........................... 279/4 X |
| 4,951,535 | 8/1990 | Hiestand ........................ 279/1 H X |
| 5,005,453 | 4/1991 | Röhm ................................ 82/142 |

FOREIGN PATENT DOCUMENTS

| | | | |
|---|---|---|---|
| 213682 | 2/1961 | Austria ............................ 279/114 |
| 3314629 | 10/1985 | Fed. Rep. of Germany . |

*Primary Examiner*—Larry I. Schwartz
*Assistant Examiner*—Robert Schultz
*Attorney, Agent, or Firm*—Herbert Dubno; Andrew Wilford

[57] ABSTRACT

A power chuck has a stationary housing, a chuck spindle rotatable in the housing about a chuck axis, a plurality of jaws carried on the chuck body movable radially toward and away from one another, an actuator shaft movable axially relative to the body, and a jaw actuator connected between the actuator shaft and the jaws for displacing same radially outward on displacement of the element in one axial direction and for displacing the jaws radially inward on opposite axial displacement of the shaft. The jaws, shaft, and jaw actuator are rotatable about the axis relative to the spindle. A motion-converter carried on the spindle includes an input element centered on and rotatable about the axis on the spindle, an output element axially displaceable on the spindle, and gearing interconnecting the input and output elements for axial displacement of the output element in one direction on rotation of the input element in one sense and axial displacement of the output element in the opposite axial direction on rotation of the input element in the opposite sense. A bearing interconnects the output element and the shaft for joint axial movement but relative radial rotation and a brake rotationally relatively fixes the jaws, shaft, and jaw actuator relative to the spindle so as to fix the input element against rotation about the axis relative to the housing.

20 Claims, 11 Drawing Sheets

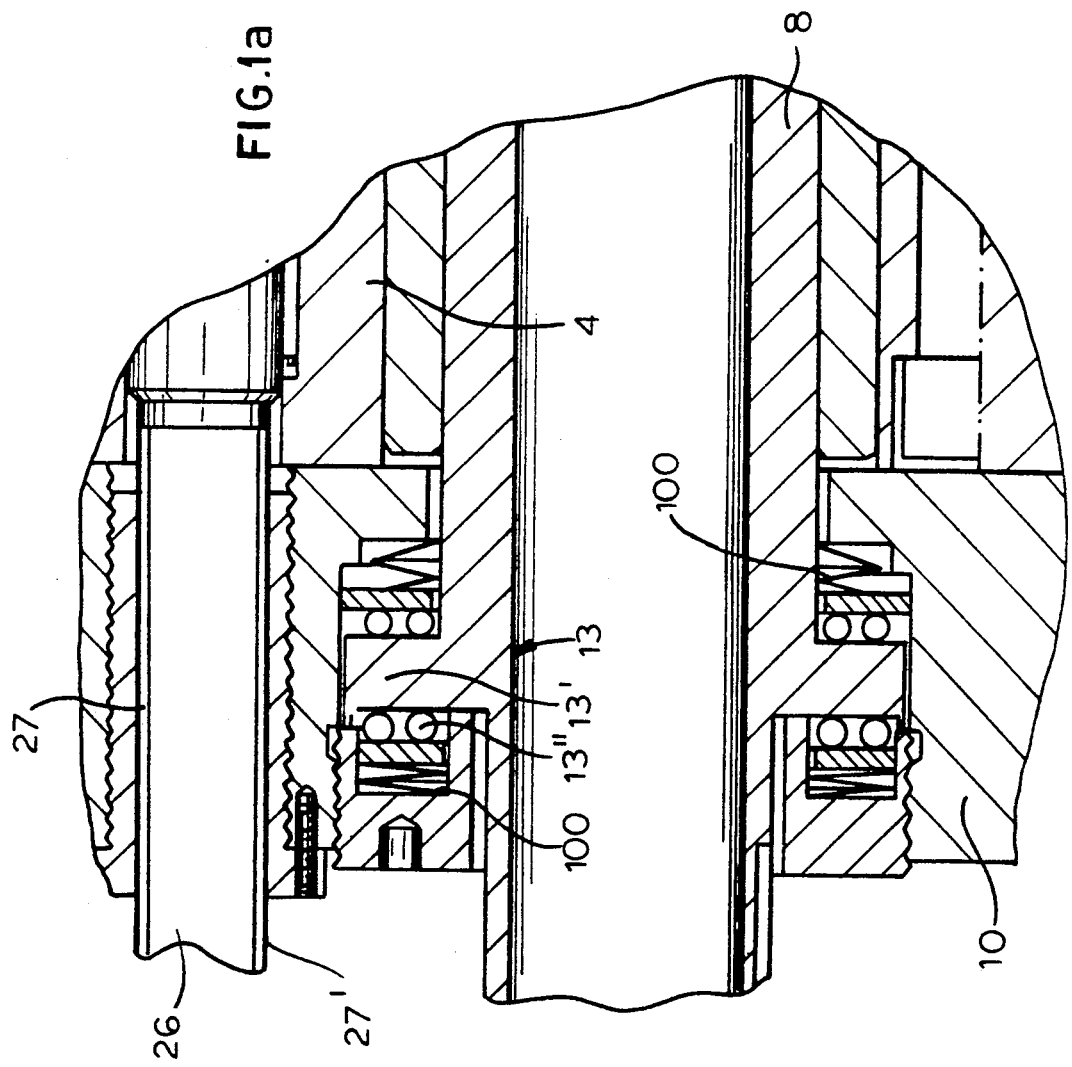

LATHE CHUCK

FIELD OF THE INVENTION

The present invention relates to a lathe chuck. More particularly this invention concerns such a chuck with a built-in actuator for opening and closing the chuck.

BACKGROUND OF THE INVENTION

A standard lathe chuck has a spindle that is rotated at high speed and that has a head carrying a plurality of jaws that can be moved radially. The spindle is typically hollow and houses an actuating rod that is axially displaceable in the spindle and that is connected in the head to mechanism that displaces the jaws radially together when the rod is moved axially in one direction and that displaces them axially apart when moved axially oppositely. These jaws can be used to externally or internally grip a workpiece held by the chuck.

It is known to provide on the end of the spindle remote from the chuck head a transmission having an input member rotatable about the spindle axis, an output member axially coupled to the actuating rod, and gearing interconnecting the two members to convert rotation in one direction of the input member into axial movement in one direction of the output member, and opposite rotation into opposite axial movement. The gearing can be at least one shaft extending parallel to the spindle and having one end formed with a pinion meshing with the rotary input member and an opposite end formed with a thread engaged axially in the output member.

German patent document 3,314,629 describes such an arrangement wherein the same motor is used both for moving the jaws during chucking and unchucking of the workpiece and for rotating the chuck during machining. For jaw adjustment the chuck is stopped and both the spindle and the jaw actuator are rotationally arrested and the motor is coupled directly to the input member of the jaw-operating transmission. For subsequent machining the brakes effective on the jaw actuator and on the spindle are released and the motor is reconnected to the spindle so that same and the transmission input element are rotated synchronously.

The main disadvantage of this system is that it is absolutely essential to arrest the chuck during any jaw-adjustment operation. It is impossible to tighten or loosen the jaws while the chuck is rotating, so that valuable time must be lost letting the chuck turn to a halt or to start the chuck rotating each time a workpiece, for instance, is changed. Furthermore tightening the jaws during machining to ensure that the workpiece remains tightly held is impossible.

OBJECTS OF THE INVENTION

It is therefore an object of the present invention to provide an improved chuck.

Another object is the provision of such an improved chuck which overcomes the above-given disadvantages, that is whose jaws can be moved even when the chuck is rotating.

SUMMARY OF THE INVENTION

A power chuck according to the invention has a stationary housing, a chuck spindle rotatable in the housing about a chuck axis, a plurality of jaws carried on the chuck body movable radially toward and away from one another, an actuator shaft movable axially relative to the body, and a jaw actuator connected between the actuator shaft and the jaws for displacing same radially outward on displacement of the element in one axial direction and for displacing the jaws radially inward on opposite axial displacement of the shaft. The jaws, shaft, and jaw actuator are rotatable about the axis relative to the spindle. A motion-converter carried on the spindle includes an input element centered on and rotatable about the axis on the spindle, an output element axially displaceable on the spindle, and gearing interconnecting the input and output elements for axial displacement of the output element in one direction on rotation of the input element in one sense and axial displacement of the output element in the opposite direction on rotation of the input element in the opposite sense. A bearing interconnects the output element and the shaft for joint axial movement but relative radial rotation and a brake rotationally relatively fixes the jaws, shaft, and jaw actuator relative to the spindle so as to fix the input element against rotation about the axis relative to the housing. In a machining position the jaws, shaft, and jaw actuator are rotationally fixed relative to the spindle while the input element is permitted to rotate freely about the axis and, in an adjusting position, the input element is fixed against rotation relative to the housing and the jaws, shaft, and jaw actuator are freed to rotate relative to the spindle. Thus in the adjusting position rotation of the spindle will adjust the position of the jaws and in the machining position arresting of the input element will also adjust the position of the jaws.

With this system, therefore, it is possible to adjust the chuck both when it is stationary and when it is rotating. Only a single drive motor connected to the spindle is used for the adjustment, the brake being applied when the chuck is stationary for the adjusting operation.

According to a feature of this invention the brake means includes an openable and closable link unit engageable between the spindle and the jaw actuator and displaceable between a coupling position rotationally linking same and thereby rotationally linking the shaft and jaws to the spindle and a decoupling position permitting the jaws, shaft, and jaw actuator to rotate in the spindle. This link unit can include a link body axially displaceable in the spindle, the actuator being formed with an axially open recess in which the link body is engageable, a spring braced between the link body and the spindle and urging the body axially toward the recess, and a cylinder formed in the spindle around the body and pressurizable to displace the body away from the recess and compress the spring.

Further such link units can be provided for between the housing and the input member and between the housing and the shaft. They allow the critical parts of the chuck to be arrested for jaw adjustment by the main chuck drive.

In accordance with a further feature of this invention the spindle has an outer end fixed to and carrying the jaw actuator and an inner end adapted to be connected to a drive means. In this case the brake includes a normally closed clutch between the inner and outer spindle ends and normally rotationally linking same together, and an openable and closable link unit engageable between the housing and the outer spindle end and displaceable between a coupling position rotationally linking same, opening the clutch, and thereby rotationally arresting the outer spindle end and a decoupling position rotationally coupling the spindle ends. This system can be installed relatively easily in an existing lathe. The simultaneous decoupling of the two spindle halves and arresting of the jaw actuator is an extremely simple and effective solution to the problems of actuation of the jaws while the chuck is rotating or stationary.

In accordance with a further feature of this invention the motion-converter includes two such input members adjacent each other and gear means meshing therewith and constraining same to rotate oppositely about the axis. The brake means includes means for selectively retarding rotation of the input members about the axis, either in the form of a standard disk-type clutch, or as respective coils juxtaposed with the input members. The use of coils generating eddy currents in the ferrous input members is particularly simple since it avoids all direct contact and allows braking force to be adjusted wholly electrically.

The gearing according to the invention includes at least one rod threaded axially into the output member and having a gear, one of the input members having teeth meshing with the gear of the output member. The two input members can have confronting toothed faces and a gear is provided that is rotatable about an axis perpendicular to the chuck axis. In this case the spindle is provided with a radially projecting pivot centered on the axis of the gear and rotationally supporting the gear. Alternately the input members can be formed with gear teeth and the gearing includes two such rods each formed with teeth meshing with the teeth of a respective input member. In this case meshing teeth are formed on the two rods. In another system the motion-converter includes a ring rotatable about the chuck axis on the spindle, the rod being journaled in the ring, and gear teeth formed on the spindle. Here the rod is formed with one set of gear teeth meshing with the one input member and another set of gear teeth meshing with the teeth formed on the spindle.

In accordance with a further feature of the invention the output member is provided with a bushing in which the rod is axially threaded and with a pair of stops permitting the bushing to rotate through less than one revolution in the output member on rotation of the rod. This allows the rod to get up a little speed when it is rotating before it starts to rotate relative to the bushing so that its threads cannot become frozen readily. In any case a spring is provided to permit limited axial movement of the rod relative to the output member. The bearing include axial-thrust bearings oppositely axially braced between the output member and the rod and the springs are axially oppositely braced between the bearings and the output member.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 1a is a large-scale view of a detail of a variant on the structure of FIG. 1;

SPECIFIC DESCRIPTION

Figure 1:
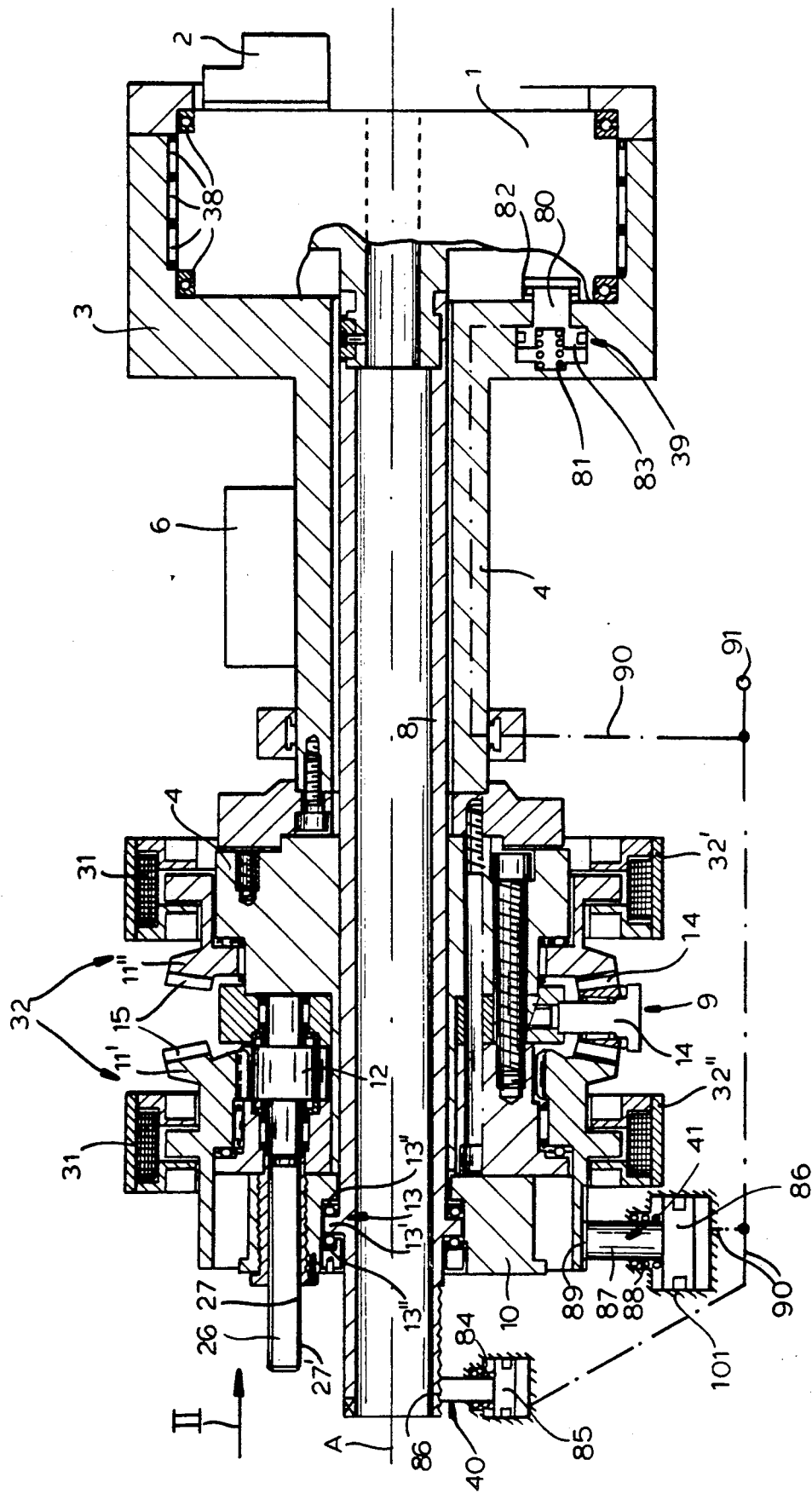
FIG. 1 is a partly diagrammatic axial section through the chuck assembly according to this invention.
Figure 2:
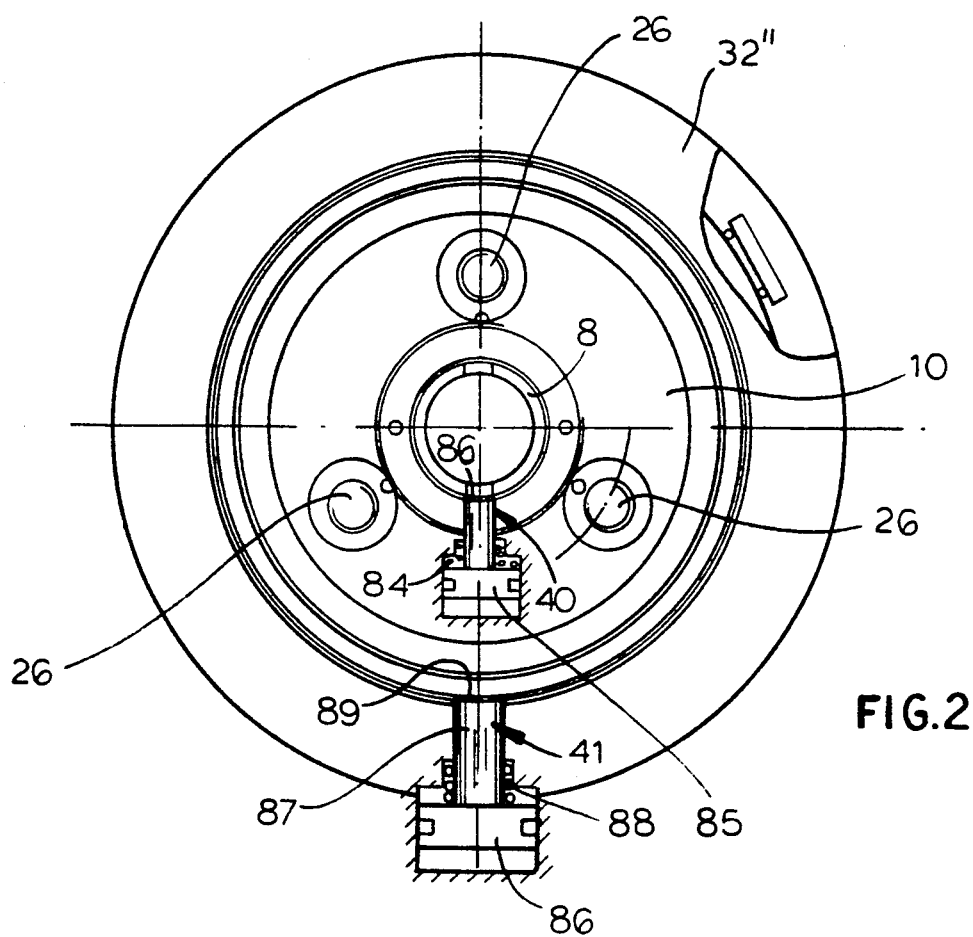
FIG. 2 is an end view taken in the direction of arrow II of FIG. 1.
Figure 3:
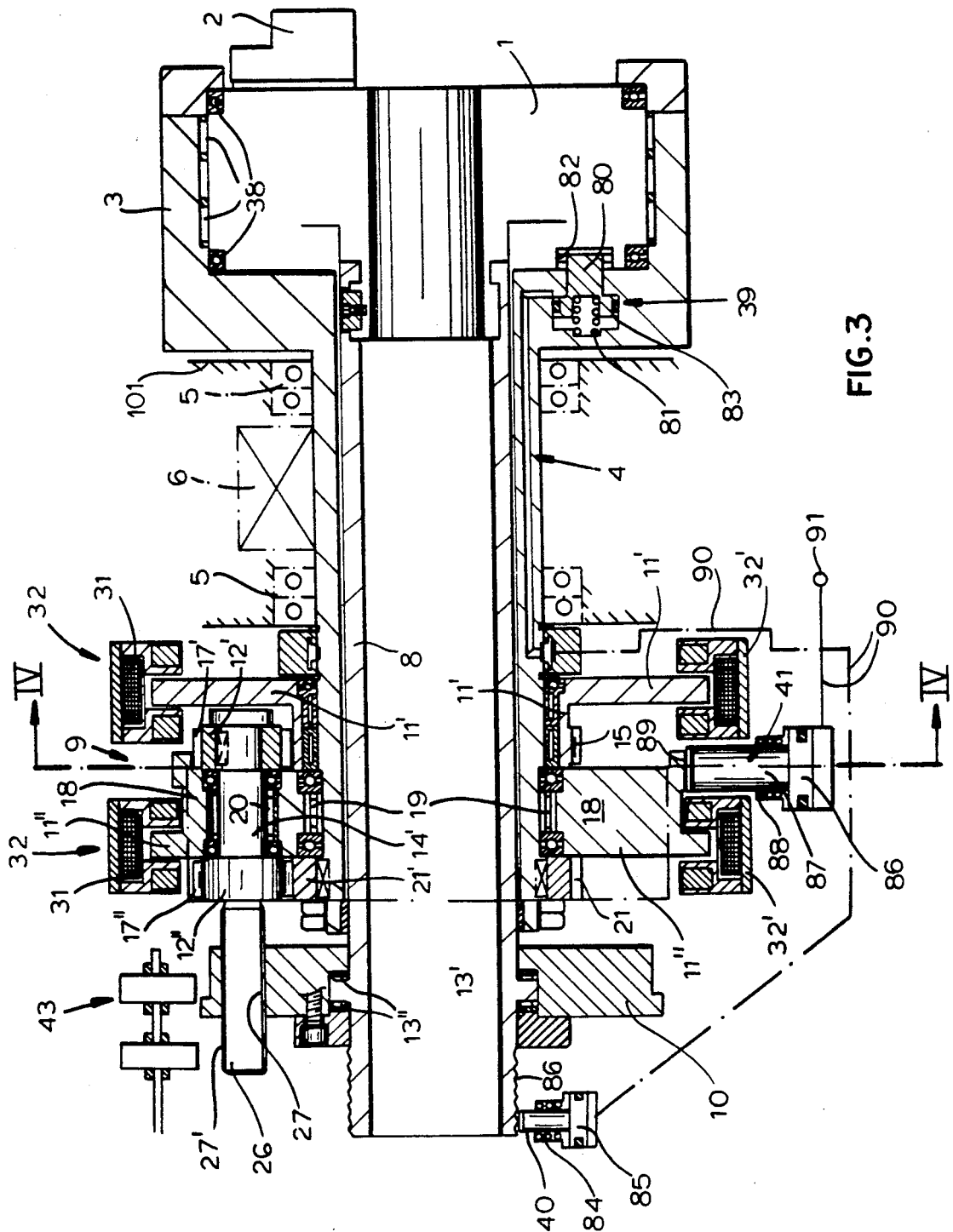
FIG. 3 is a view like FIG. 1 of another system according to the invention.

As seen in FIGS. 1 and 2 a chuck according to this invention has a spindle 4 centered on a normally horizontal axis A and having at one end a head 3 in which a plurality of angularly equispaced jaws 2 are radially displaceable. A standard converter 1 is connected to the jaws 2 (only one shown) and to an axially displaceable shaft 8 extending coaxially in the spindle 4. This converter 1 transforms axial displacement of the shaft 8 into synchronous radial displacement of the jaws 2, typically by means of angled Wedge formations formed on the shaft 8 fitting with complementary angled formations on the jaws 2. As illustrated in FIG. 3 bearings 5 support the spindle 4 on a stationary machine housing 101 for rotation about the axis A. A motor illustrated schematically at 6 rotationally drives the spindle 4 either directly or via belts reeved in a pulley such as shown at 7 in FIG. 1.

The shaft 8 is displaced axially in the spindle 4 by a motion converter or transmission 9 having an output member 10 axially coupled to the shaft 8 and members 12. A coupling 13 is provided for transmitting axial force from the output member 10 to the shaft 8. This coupling 13 comprises as better shown in FIG. 1a a radially outwardly projecting ridge 13' formed on the shaft 8 and a pair of roller bearings 13" flanking the ridge 13' and braced axially oppositely against the member 10. In addition as seen in FIG. 1a springs in the form of stacks of belleville washers 100 can be provided between each bearing 13" and the member 10.

The transmission comprises a pair of facing bevel gears 11' and 11" forming input members that are independently rotatable about the axis A on the spindle 4 and that have facing sets of teeth 15 that mesh with at least one pinion 14 carried on a pin 16 projecting radially from the spindle 4. Thus rotation of one of the gears 11' or 11" in one direction will force identical but opposite rotation of the other gear. Each member 12 is a gear meshing with an annulus of teeth formed on an inside edge of the gear 11', and formed with a stem or rod 26 projecting axially and formed with an external screwthread 27' threaded into a hole of a bushing 27 fixed in the output member 10. Normally several such gears 12, three as indicated in FIG. 2, are provided that are angularly equispaced about the axis A.

Each of the gears 11' and 11" has a radially outwardly projecting ferrous rim received in a respective actuator 32' or 32" having a coil 31 and forming a braking unit 32. This unit 32 can electromagnetically brake rotation of either of the gears 11' or 11". Thus presuming the spindle 4 to be rotating about the axis A, it is possible to move the jaws 2 together or apart by applying a braking torque to one of the gears 11' or 11". Presuming the coil 32' is used to apply a braking torque to the gear 11", this will cause the gears 14 to rotate and will in turn make the gear 11' rotate opposite to the gear 11". The gears 12 will be rotated to screw the rods 26 in the output member 10 and same and the shaft 8 will be displaced axially. On the other hand if the gear 11' is braked the orbiting gears 12 will rotate oppositely for axially opposite displacement of the shaft 8 and jaws 2.

FIGS. 1 and 2 also show how a latch unit 39 has a latch member 80 axially displaceable in the chuck head 3 and having an outer end engageable in a complementary recess 82 in the axial/radial converter 1 which is as illustrated mounted via bearings 38 in the head 3 for rotation therein about the axis A. A spring 81 urges the member 80 into the latched position coupling the unit 1 and jaws 2 with the head 3 and the chamber in which the member 80 can move axially can be pressurized via a pneumatic line 90 from a source 91 to uncouple the converter 1 from the head 3.

Similarly another latch unit 40 has a member 85 engageable in a groove 86 formed in the shaft 8 and biased by a spring 84 into an unlatched position permitting the shaft 8 to rotate freely relative to the housing 101 in which the piston 85 is slidable. Once again the pneumatic line 90 can be pressurized from a supply indicated schematically at 91, but here to latch the unit 40 and prevent rotation of the shaft 8.

Yet another latch 41 has a piston 86 seated in the housing 101 and provided with a shaft 87 engageable in a groove formed in a collar extension formed on the one gear 11'. A spring 88 pushes the element 87 into the unlatched position and pressurization from the line 90 can lock the member 11' from rotating about the axis A.

Hence when the chuck is not rotating pressurization of the line 90 will rotationally decouple the motion converter 1 from the head 1 but will rotationally arrest the shaft 8, converter 1, and the gear 11'. Rotation of the spindle 4 will therefore effect the desired axial shifting of the shaft 8 by orbiting the gear 11" which is not held by its brake coil 31 and rotating the rods 26, thereby screwing these rods 26 in the output member 10 and shifting it and the shaft 8 axially relative to the spindle 4.

Figure 4:
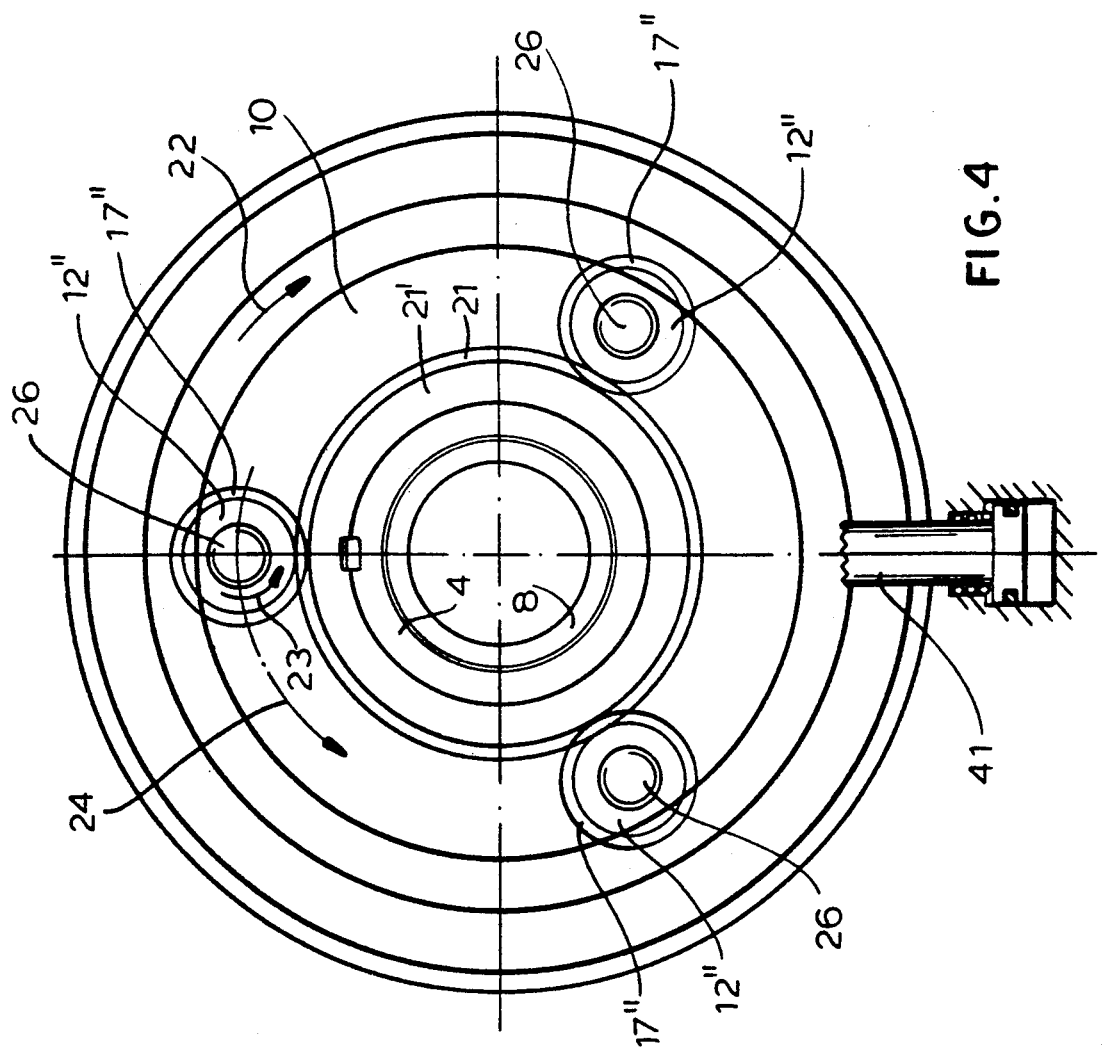
FIG. 4 is a section taken along line IV—IV of FIG. 3.

FIGS. 3 and 4 show an arrangement wherein there are three angularly equispaced output members 12" each carrying a pair of gears 17' and 17" that respectively mesh with gears 15 and 21' respectively formed on the member 11' and on the spindle 4. These gears 17' and 17" are carried on a shaft 14' supported by bearings 20 in a ring 18 rotatable on the spindle about the axis A and formed with the other member 11". In addition this arrangement is provided with position sensors 43 connected to a controller that operates the magnet assembly 32 for operating the chuck. The latch unit 41 is here connected to the ring 18. Otherwise this unit is identical to that of FIGS. 1 and 2.

With the system of FIGS. 3 and 4 when spindle 4 is rotating and the members 11' and 11" are free to rotate, they will turn opposite each other and the rods 26 will not rotate. On the other hand, arresting or retarding the member 11', for instance, will cause the rods 26 to rotate in one direction, while arresting the member 11" connected to the ring 18 will oppositely rotate them. If the spindle 4 is fixed, the line 90 is pressurized and the motor 6 is actuated in conjunction with one or the other of the coils 31 to open or close the chuck.

Figure 5:
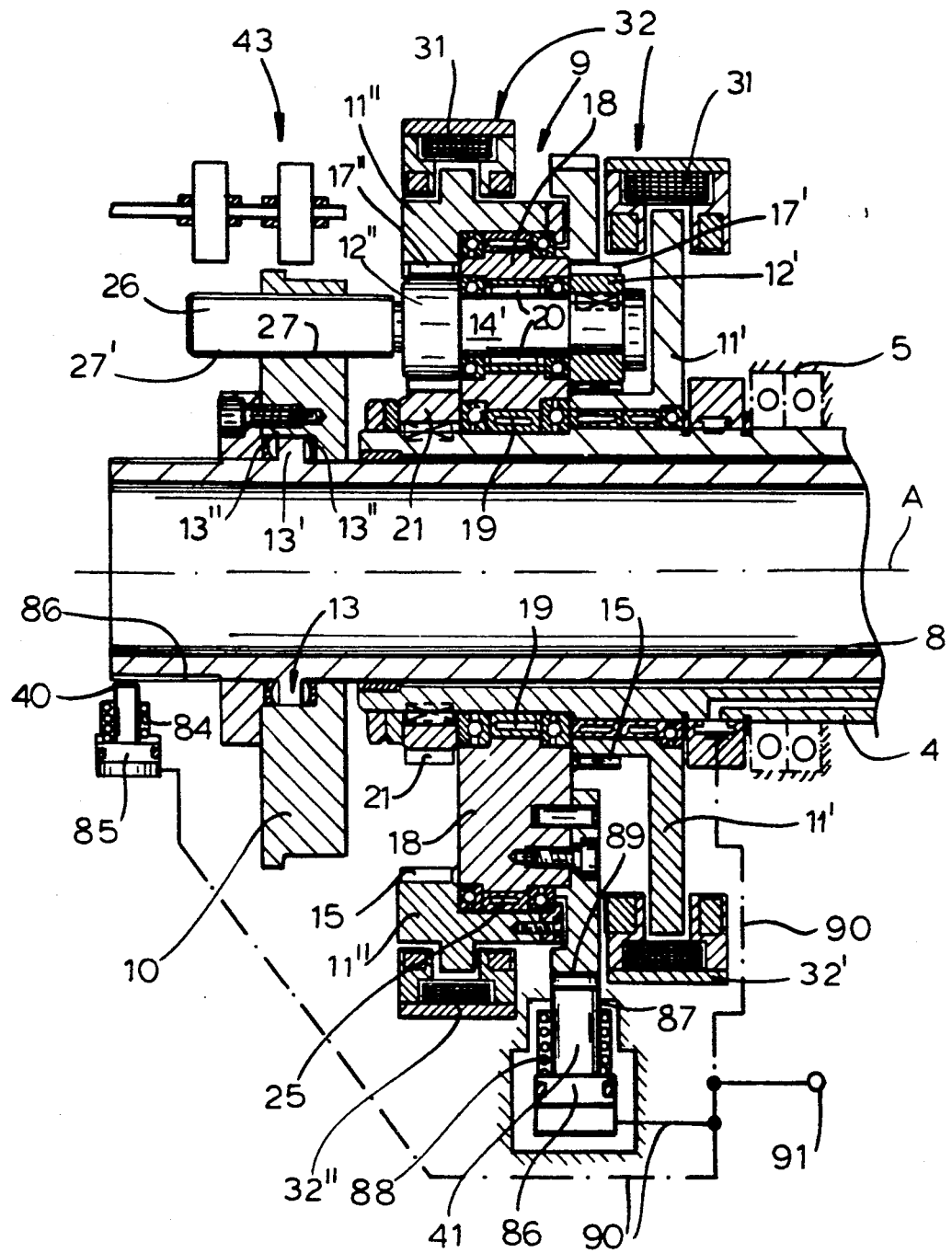
FIG. 5 is a sectional view of a detail of a variant on the structure of FIG. 3.
Figure 6:
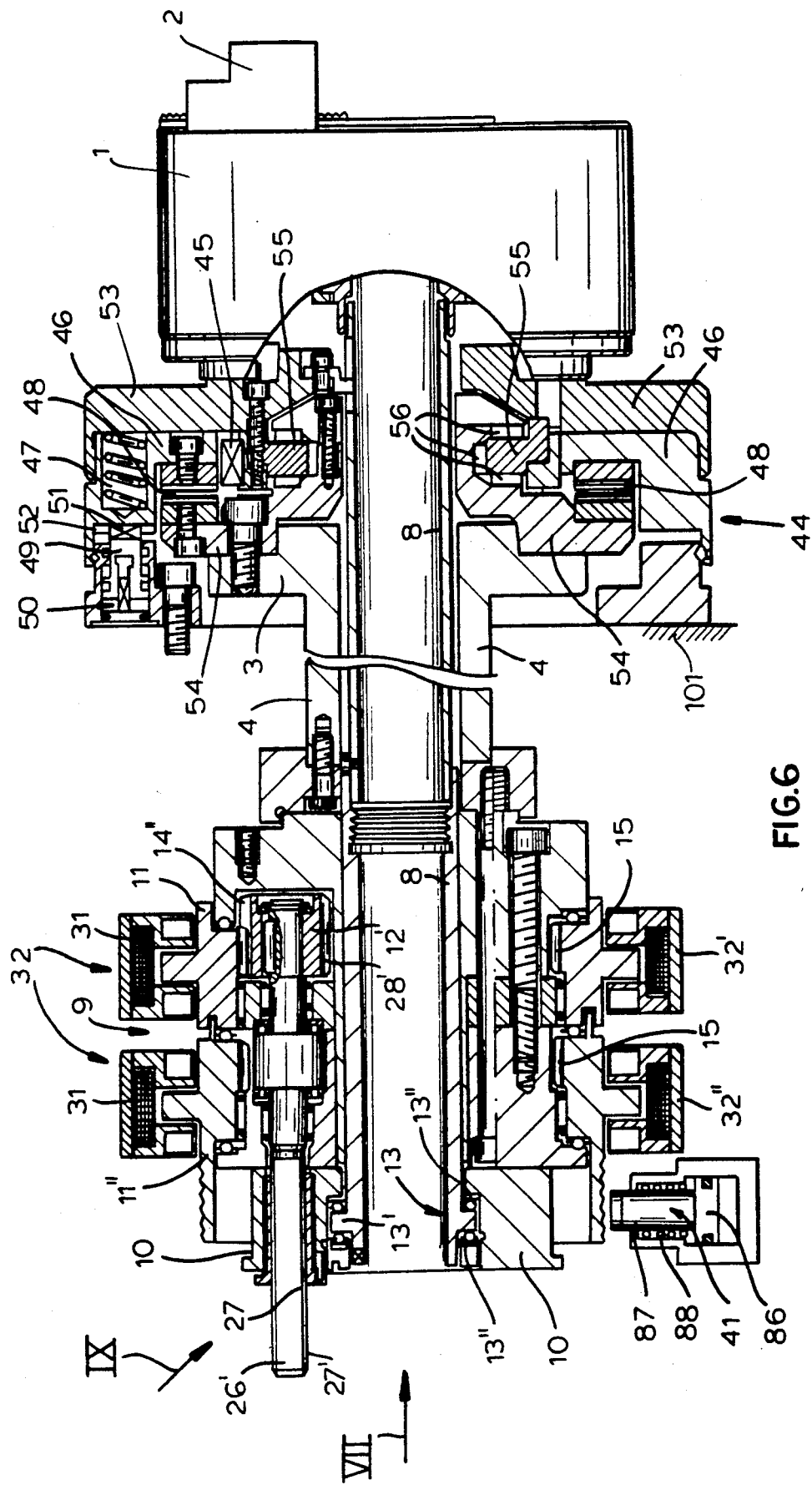
FIG. 6 is a view like FIG. 1 of yet another system in accordance with the invention.
Figure 7:
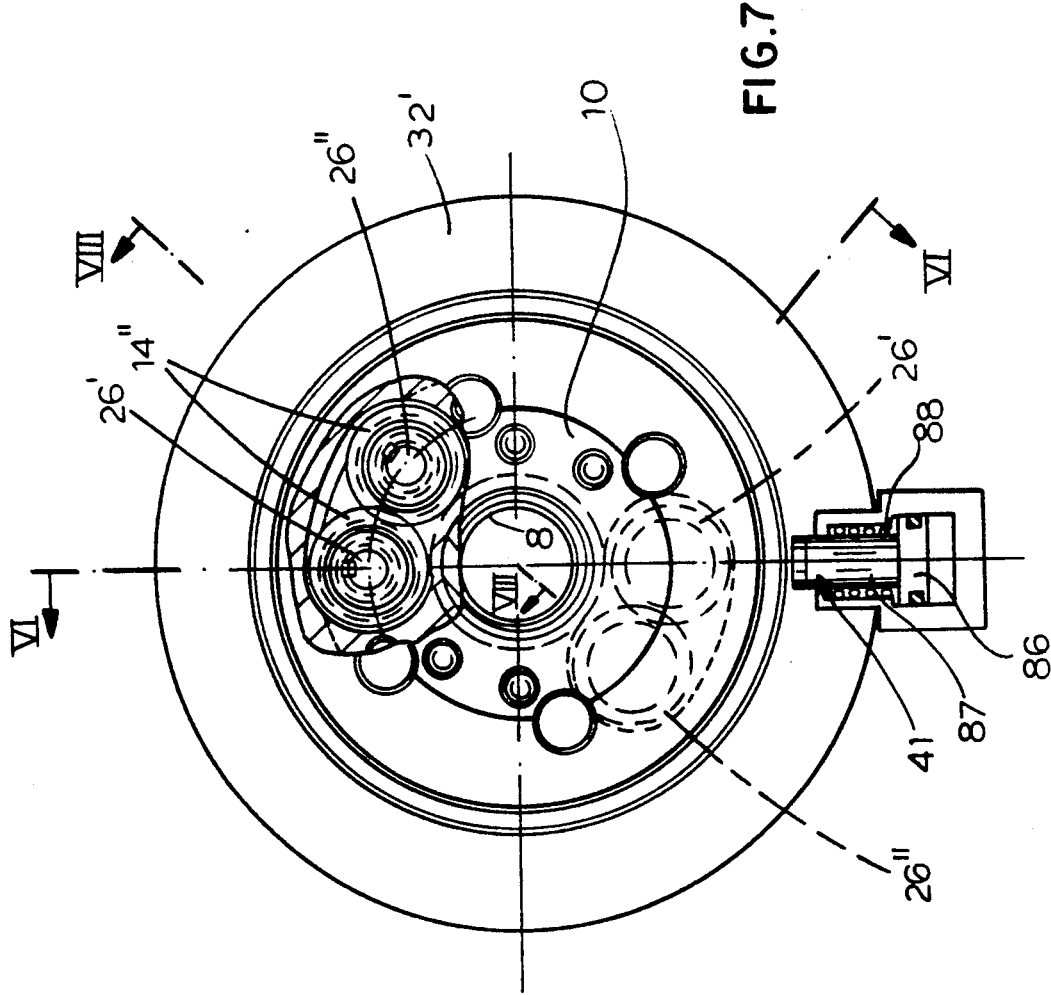
FIG. 7 is an end view taken in the direction of arrow VII of FIG. 6, line VI—VI of FIG. 7 being the section plane for FIG. 6.
Figure 8:
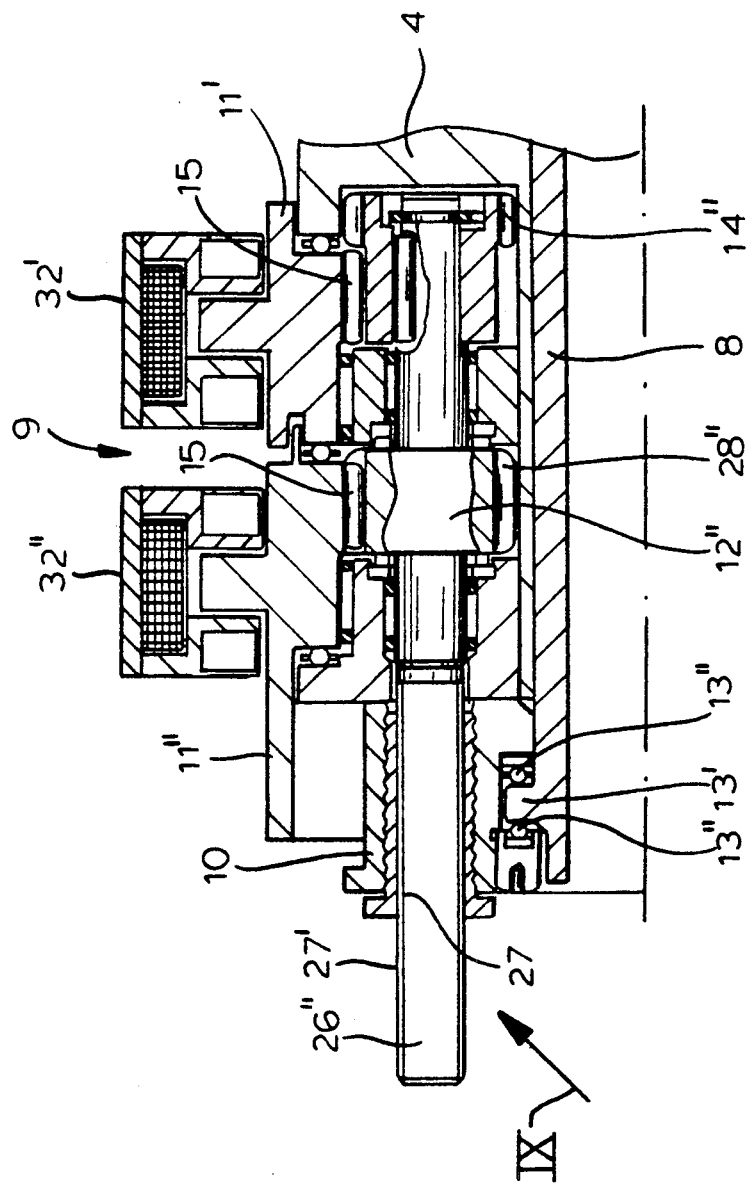
FIG. 8 is a section taken along line VIII—VIII of FIG. 7.

In FIG. 5 each member 12' has teeth 17 that mesh as in FIG. 3 with external teeth of the respective input member 12', but each member 12" has teeth 17" that mesh with internal teeth of the member 11' The axles for the coaxial members 12' and 12" are supported in the bearings 20 in the ring 18 which here is supported by bearings 19 for rotation about the axis A. The latch unit 41 works on the ring 18.

Another system is shown in FIGS. 6 through 10. Here diametrically opposed pairs of actuator screws or rods 26' and 26" whose screwthreads 27' are of opposite hand are used. They have respective pinions 28' and 28" that serve as input members 12' and 12" and that mesh respectively with teeth 15 formed on the members 11' and 11". In addition each rod 26' is provided at its end with gearing 14" that meshes with identical gearing of the adjacent rod 26", so that each rod 26' will always rotate exactly opposite to the adjacent such rod 26", and vice versa.

Figure 10:
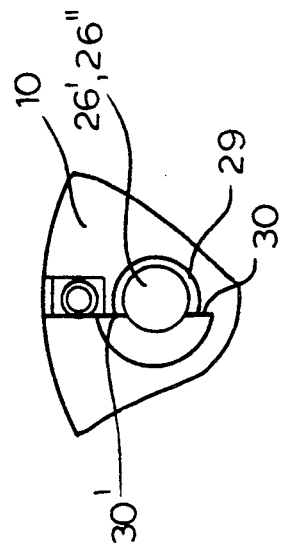
FIG. 10 is an end view taken in the direction of arrow X of FIG. 9.
Figure 9:
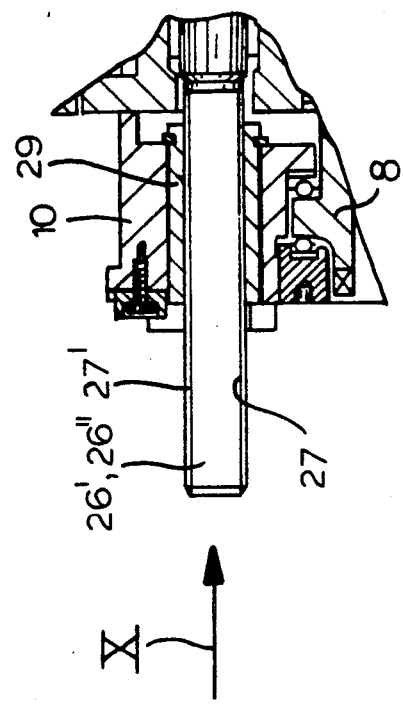
FIG. 9 is a detail view of the structure indicated at IX in FIGS. 6 and 8.

FIGS. 9 and 10 further show how in this arrangement each of the rods 26' and 26" is received in a bushing 29 that is axially fixed in the output member 10 but that is limitedly rotatable through somewhat less than 180° between stops 30 and 30' fixed on the output member 10. This allows the rods 26' and 26" and their bushings 29 to rotate somewhat and get up a little speed before they start axially moving the member 10, thereby making it easier to adjust a chuck that is somewhat frozen from having been left clamped for a while, ensuring that the threads 27' will not become stuck in the bore 27.

This arrangement also has a clutch 44 between the drive spindle 4 and the chuck actuator 1. This clutch 44 has a plate 46 rotationally coupled via keys 45 to a member 53 fixed to the actuator 1 and another plate 54 fixed on the spindle 4, with Hirth serrations 48 provided on confronting faces of the plates 46 and 54 and a spring 47 urging the plate 46 toward the plate 54. A pusher element 49 axially displaceable on the housing 101 can be pressed by a hydraulic piston arrangement 50 against the plate 46 to push it out of engagement with the spindle 4 and body 3, that is against the force of the spring 47 to open the clutch 44. This element 49 has a locking part 51 engageable in radial grooves 52 of the plate 46 so that when it opens the clutch 44 it rotationally arrests the actuator 1.

The latch unit 41 here prevents the members 11' and 11" from rotating when the clutch 44 is open and the actuator 1 is arrested rotationally. In this position when the spindle 4 is driven as described above the transmission 9 can effect the desired opening or closing of the jaws 2

Figure 11:
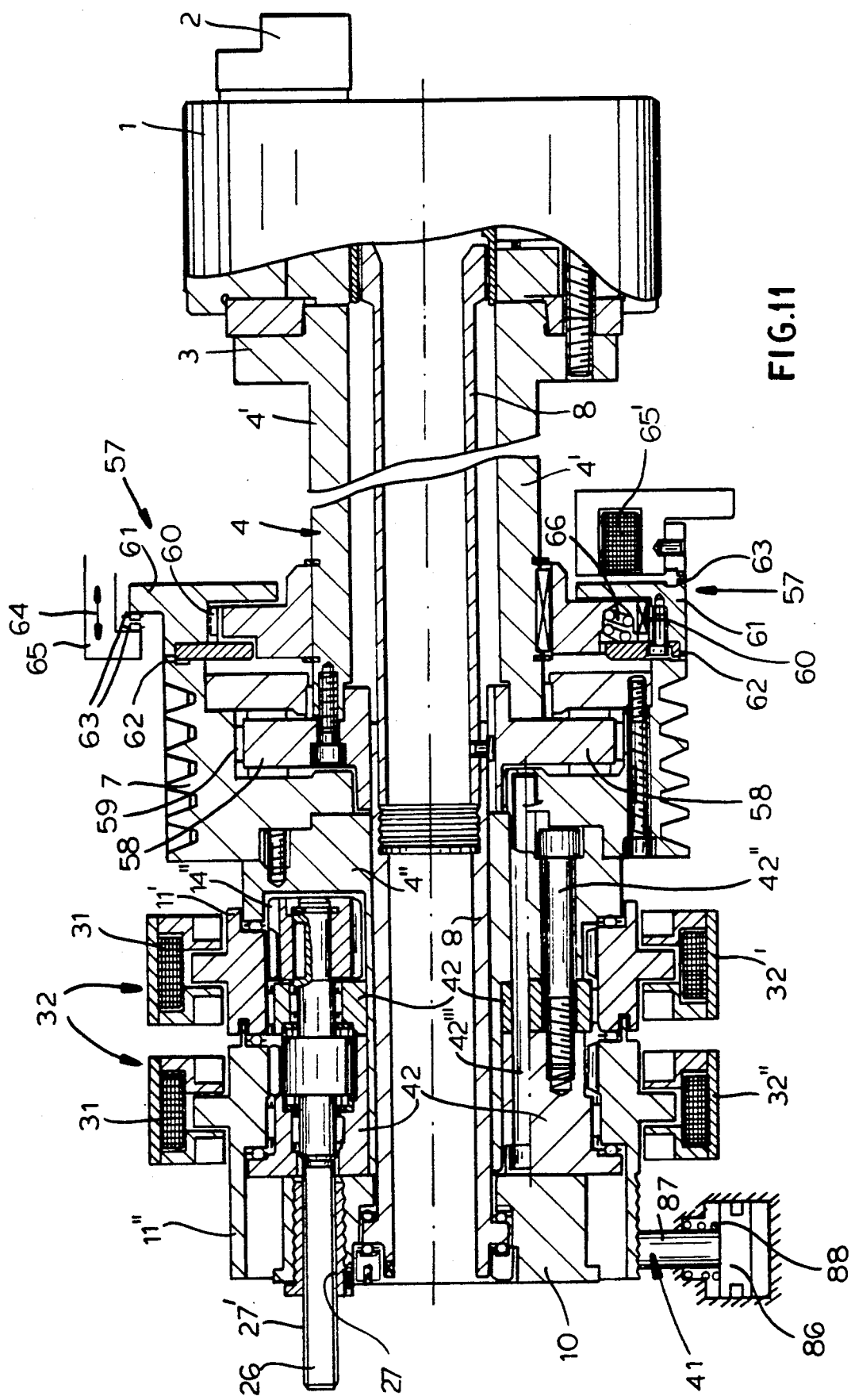
FIG. 11 is a view like FIG. 1 of a further system according to the invention.

In the arrangement of FIG. 11 the spindle 4 has an outer part 4' carrying the chuck head 3 and an inner part formed of elements 42 and 42' held together by bolts 42" and 42''' that carry the transmission 9 and the drive pulley 7. A clutch 57 is provided between the parts 4' and 4" comprised of a plate 61 secured by splines to the part 4' and engageable with teeth 62 of the pulley 7. Further teeth 63 can be engaged by a clutch actuator 65 movable axially as shown at 64 or by an electromagnetic actuator 65'. A spring 66 normally urges the clutch to the closed condition, with the teeth 62 engaged and the parts 4' and 4" rotationally coupled. The actuator 65 or 65' can pull the teeth 62 apart and engage the teeth 63 together to rotationally arrest the part 4'. Such arresting of the part 4' allows the drive to be effective to open or close the clutch while it is stationary.

I claim:

1. A power chuck comprising:
    a stationary housing;
    a chuck spindle rotatable in the housing about a chuck axis;
    a plurality of jaws carried on the chuck body movable radially toward and away from one another;
    an actuator shaft movable axially relative to the body;
    jaw-actuator means connected between the actuator shaft and the jaws for displacing same radially outward on displacement of the shaft in one axial direction and for displacing the jaws radially inward on opposite axial displacement of the shaft;
    means for supporting the jaws, shaft, and jaw-actuator means for rotation about the axis relative to the spindle;
    motion-converting means carried on the spindle and including
        an input member centered on and rotatable about the axis on the spindle,
        an output member axially displaceable on the spindle, and
        gearing interconnecting the input and output member for axial displacement of the output member in one direction on rotation of the input member in one sense and for axial displacement of the output member in the opposite direction on rotation of the input element in the opposite sense;
    bearing means interconnecting the output member and the shaft for joint axial movement and relative rotation;
    brake means for rotationally relatively fixing the jaws, shaft, and jaw-actuator means relative to the spindle and for fixing the input member against rotation about the axis relative to the housing; and
    control means connected to the brake means for, in a machining position, rotationally fixing the jaws, shaft, and jaw-actuator means relative to the spindle while permitting the input member to rotate freely about the axis and, in an adjusting position, for fixing the input member against rotation relative to the housing and freeing the jaws, shaft, and jaw-actuator means to rotate relative to the spindle, whereby in the adjusting position rotation of the spindle will adjust the position of the jaws and in the machining position arresting of the input member will also adjust the position of the jaws.

2. The chuck defined in claim 1 wherein the brake means includes an openable and closable link unit engageable between the spindle and the jaw-actuator means and displaceable between a coupling position rotationally linking same and thereby rotationally linking the shaft and jaws to the spindle and a decoupling position permitting the jaws, shaft, and jaw-actuator means to rotate in the spindle.

3. The chuck defined in claim 2 wherein the link unit
    a link body axially displaceable in the spindle, the actuator being formed with an axially open recess in which the link body is engageable,
    a spring braced between the link body and the spindle and urging the body axially towar the recess, and
    a cylinder formed in the spindle around the body and pressurizable to displace the body away from the recess and compress the spring.

4. The chuck defined in claim 1 wherein the brake means includes an openable and closable link unit engageable between the housing and the shaft and displaceable between a coupling position rotationally linking same and thereby rotationally arresting the shaft and a decoupling position permitting the shaft to rotate in the housing.

5. The chuck defined in claim 4 wherein the link unit
    a link body axially displaceable in the housing, the shaft being formed with an radially open recess in which the link body is engageable,
    a spring braced between the link body and the housing and urging the body axially away from the recess, and
    a cylinder formed in the housing around the body and pressurizable to displace the body away from the recess and compress the spring.

6. The chuck defined in claim 1 wherein the brake means includes an openable and closable link unit engageable between the housing and the input member and displaceable between a coupling position rotationally linking same and thereby rotationally arresting the input member and a decoupling position permitting the input member to rotate in the housing.

7. The chuck defined in claim 6 wherein the link unit
    a link body axially displaceable in the housing, the input member being formed with an radially open recess in which the link body is engageable,
    a spring braced between the link body and the housing and urging the body axially away from the recess, and
    a cylinder formed in the housing around the body and pressurizable to displace the body away from the recess and compress the spring.

8. The chuck defined in claim 1 wherein the spindle has an outer end fixed to and carrying the jaw-actuator means and an inner end adapted to be connected to a drive means, the brake means including
    a normally closed clutch between the inner and outer spindle ends and normally rotationally linking same together, and
    an openable and closable link unit engageable between the housing and the outer spindle end and displaceable between a coupling position rotationally linking same, opening the clutch, and thereby rotationally arresting the outer spindle end and a decoupling position rotationally coupling the spindle ends.

9. The chuck defined in claim 8 wherein the link unit
    a link body axially displaceable in the housing, the outer spindle end being formed with an axially open recess in which the link body is engageable, and
    a cylinder formed in the housing around the body and pressurizable to displace the body.

10. The chuck defined in claim 1 wherein the motion-converting means includes two such input members adjacent each other and gear means meshing therewith and constraining same to rotate oppositely about the axis.

11. The chuck defined in claim 10 wherein the brake means includes means for selectively retarding rotation of the input members about the axis.

12. The chuck defined in claim 11 wherein the retarding means of the brake means includes respective coils juxtaposed with the input members.

13. The chuck defined in claim 10 wherein the gearing includes at least one rod threaded axially into the output member and having a gear, one of the input members having teeth meshing with the gear of the output member.

14. The chuck defined in claim 10 wherein the two input members have confronting toothed faces and the gear means includes a gear rotatable about an axis perpendicular to the chuck axis.

15. The chuck defined in claim 14 wherein the spindle is provided with a radially projecting pivot centered on the axis of the gear and rotationally supporting the gear.

16. The chuck defined in claim 13 wherein each of the input members is formed with gear teeth and the gearing includes two such rods each formed with teeth meshing with the teeth of a respective input member, the gear means including meshing teeth formed on the two rods.

17. The chuck defined in claim 13 wherein the motion-converting means includes a ring rotatable about the chuck axis on the spindle, the rod being journaled in the ring, and gear teeth formed on the spindle, the rod being formed with a set of gear teeth meshing with the teeth formed on the spindle.

18. The chuck defined in claim 13 wherein the output member is provided with a bushing in which the rod is axially threaded, the output member being provided with a pair of stops permitting the bushing to rotate through less than one revolution in the output member on rotation of the rod.

19. The chuck defined in claim 13, further comprising spring means permitting limited axial movement of the rod relative to the shaft.

20. The chuck defined in claim 19 wherein the bearing means includes axial-thrust bearings oppositely axially braced between the output member and the shaft and the spring means includes springs axially oppositely braced between the bearings and the output member.

* * * * *